US008861360B2

(12) United States Patent  
Chang et al.

(10) Patent No.: US 8,861,360 B2  
(45) Date of Patent: Oct. 14, 2014

(54) DEVICE AND METHOD FOR NETWORK TROUBLESHOOTING

(75) Inventors: Patricia R. Chang, San Ramon, CA (US); Steven R. Rados, Danville, CA (US); Maria G. Lam, Oakland, CA (US); Lalit R. Kotecha, San Ramon, CA (US); Arda Aksu, Martinez, CA (US); Jack T. Tang, Danville, CA (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 93 days.

(21) Appl. No.: 13/603,822

(22) Filed: Sep. 5, 2012

(65) Prior Publication Data

US 2014/0066052 A1 Mar. 6, 2014

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl.
USPC ........... 370/235; 370/248; 370/251; 370/252; 370/362; 702/62

(58) Field of Classification Search
CPC ...... H04W 24/00; H04W 24/08; H04W 16/18
USPC .......... 455/423; 370/235, 248, 251, 252, 485; 702/62
See application file for complete search history.

(56) References Cited

U.S. PATENT DOCUMENTS

| 8,619,596 | B2 * | 12/2013 | Wiley et al. ................. 370/248 |
| 8,619,600 | B2 * | 12/2013 | Morrill et al. ................ 370/252 |
| 8,619,820 | B2 * | 12/2013 | Edwards et al. ............. 370/485 |
| 2013/0294243 | A1 * | 11/2013 | Wiley et al. ................. 370/235 |
| 2013/0301460 | A1 * | 11/2013 | Bugenhagen et al. ....... 370/252 |
| 2013/0322249 | A1 * | 12/2013 | Heinz et al. ................. 370/235 |
| 2013/0322265 | A1 * | 12/2013 | Kozisek et al. .............. 370/251 |
| 2013/0322432 | A1 * | 12/2013 | Wiley et al. ................. 370/352 |
| 2014/0025321 | A1 * | 1/2014 | Spanier, Joseph ............ 702/62 |

* cited by examiner

*Primary Examiner* — William D Cumming

(57) ABSTRACT

A monitoring device may determine an application to monitor, may determine a parameter to monitor, where the parameter is associated with at least one of a network or a device, may determine user devices from which to collect the parameter, and may transmit, to the user devices, information that identifies the application and information that identifies the parameter. The monitoring device may receive, from the user devices, information that identifies values of the parameter, may analyze the values of the parameter, may determine, based on the analysis, that the application is a cause of a problem associated with the network or the device. The monitoring device may perform an action based on determining that the application is a cause of the problem.

20 Claims, 6 Drawing Sheets

DEVICE AND METHOD FOR NETWORK TROUBLESHOOTING

BACKGROUND

User devices, such as mobile phones, may run various applications that perform various tasks (e.g., a productivity application, a gaming application, a news application, a weather application, etc.). An application may communicate with a network in order to perform the tasks.

DETAILED DESCRIPTION OF PREFERRED EMBODIMENTS

The following detailed description of example embodiments refers to the accompanying drawings. The same reference numbers in different drawings may identify the same or similar elements.

An application, running on a user device (such as a mobile phone), may cause a problem on the user device, or may cause a problem with a network to which the user device is connected. For example, the application may cause the user device to lose a connection to the network. A network provider may want to determine a cause of the problem, or factors that contribute to the problem, such as parameters of the user device when the connection was lost (e.g., a signal strength of the user device, a quantity of applications running on the user device, etc.).

In order to determine a cause of the problem, the network provider may collect information from the user device running the application. However, collecting the information from a single user device or a small quantity of user devices may not reveal a cause of the problem. The network provider may be able to better determine a cause of the problem if the network provider collects information from a large quantity of user devices (e.g., ten or more user devices, one hundred or more user devices, one thousand or more user devices, one million or more user devices, etc.). Implementations described herein may enable a network provider to more accurately diagnose problems caused by an application by collecting information associated with the problem from a large quantity of user devices. Additionally, implementations described herein may enable a network provider to more efficiently diagnose application-related problems by automating information collection.

Figure 1:
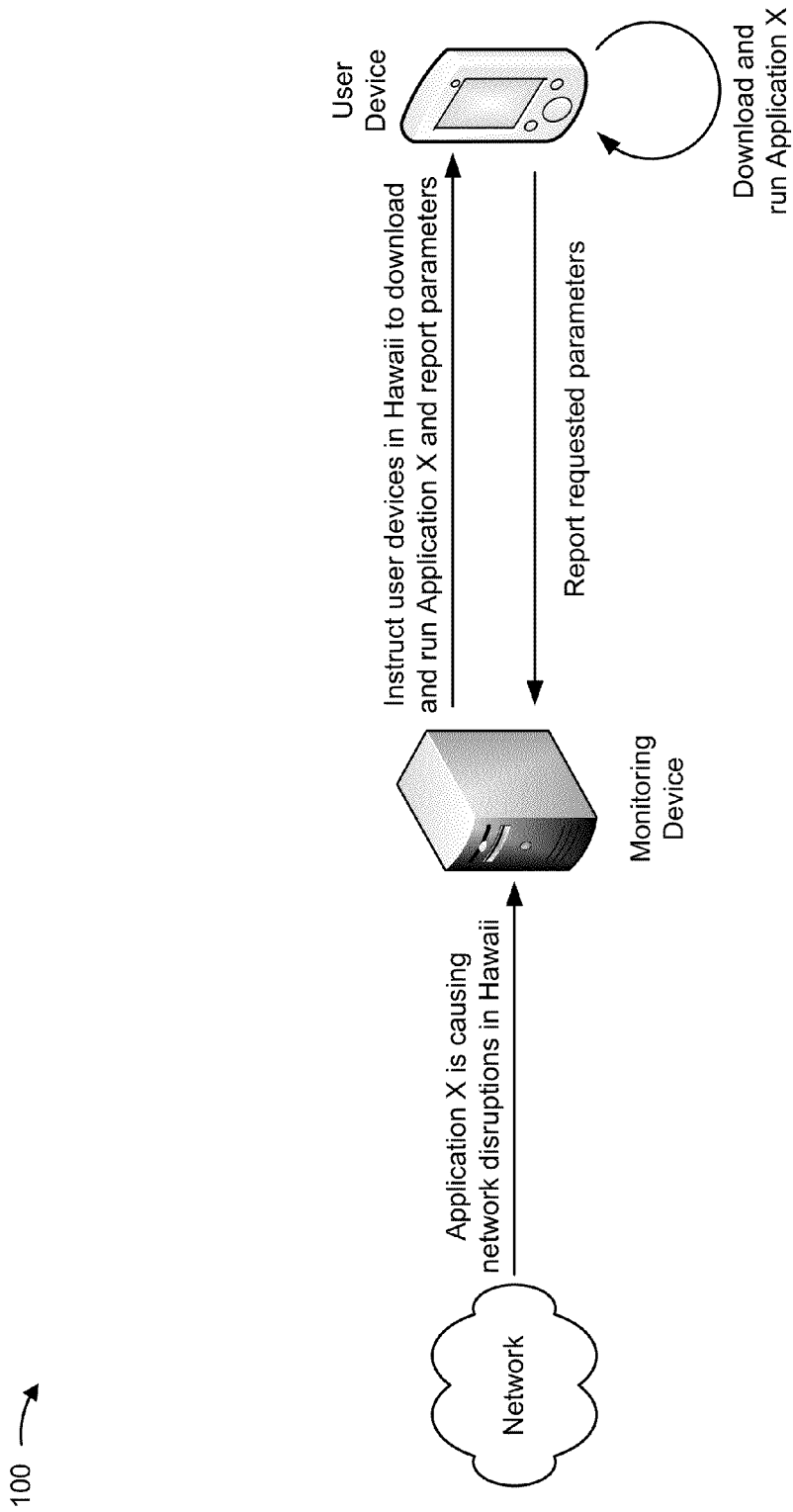
FIG. 1 is a diagram of an overview of an example implementation described herein.

FIG. 1 is a diagram of an overview 100 of an example implementation described herein. As shown in FIG. 1, the example implementation may include a network, a monitoring device, and a user device. For example, the network may be a cellular network, the monitoring device may be a server, and the user device may be a mobile phone.

As illustrated in FIG. 1, the monitoring device may receive an indication that Application X is causing network disruptions in Hawaii. The monitoring device may instruct user devices located in Hawaii to download Application X. The monitoring device may also instruct the user devices to report a parameter associated with the network disruption, such as a signal strength received by the user device when the user device is running Application X.

As further illustrated in FIG. 1, the user device may receive the instructions from the monitoring device. In response to receiving the instructions, the user device may download and run Application X. The user device may also monitor and provide the parameter requested by the monitoring device. For example, the user device may monitor a received signal strength while Application X is running, and may transmit the received signal strength to the monitoring device. The monitoring device may aggregate parameters received from multiple user devices, and may perform some action, such as providing the aggregated parameters to a user (e.g., a network provider, an application developer, an end user, etc.), disabling the application on a network, and/or some other action.

Figure 2:
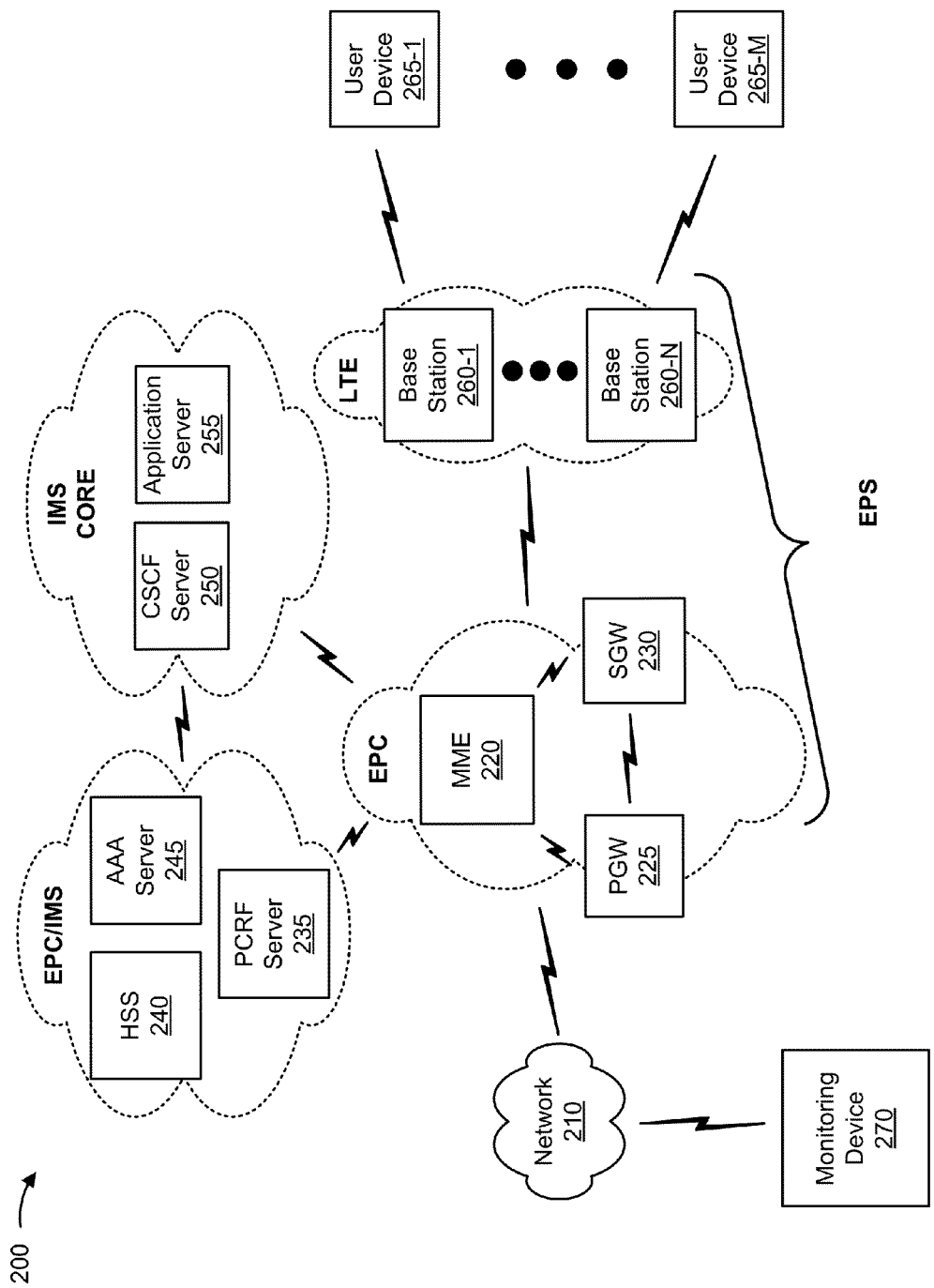
FIG. 2 is a diagram of an example environment in which systems and/or methods described herein may be implemented.

FIG. 2 is a diagram of an example environment 200 in which systems and/or methods described herein may be implemented. Environment 200 may include a network 210, a mobility management entity device 220 (hereinafter referred to as "MME 220"), a packet data network ("PDN") gateway 225 (hereinafter referred to as "PGW 225"), a serving gateway 230 (hereinafter referred to as "SGW 230"), a policy and charging rules function ("PCRF") server 235, (hereinafter referred to as "PCRF server 235"), a home subscriber server ("HSS") 240 (hereinafter referred to as "HSS 240"), an authentication, authorization, and accounting ("AAA") server 245 (hereinafter referred to as "AAA server 245"), a call session control function ("CSCF") server 250 (hereinafter referred to as "CSCF server 250"), an application server 255, a set of base stations 260-1 through 260-N (N≥1) (hereinafter referred to collectively as "base stations 260," and individually as "base station 260"), a set of user devices 265-1 through 265-M (M≥1) (hereinafter referred to collectively as "user devices 265," and individually as "user device 265"), and a monitoring device 270.

An implementation is described herein as being performed within a long term evolution ("LTE") network for explanatory purposes. Some implementations may be performed within a network that is not an LTE network, such as a third generation ("3G") network.

Environment 200 may include an evolved packet system ("EPS") that includes an LTE network and/or an evolved packet core ("EPC") that operate based on a third generation partnership project ("3GPP") wireless communication standard. The LTE network may be a radio access network ("RAN") that includes one or more base stations 260 that take the form of evolved Node Bs ("eNBs") via which user device 265 communicates with the EPC. The EPC may include MME 220, PGW 225, and SGW 230 that enable user device 265 to communicate with network 210 and/or an Internet protocol ("IP") multimedia subsystem ("IMS") core. The IMS core may include CSCF server 250 and/or application server 255, and may manage authentication, session initiation, account information, profile information, etc., associated with user device 265. PCRF server 235, HSS 240, and AAA server 245 may reside in the EPC and/or the IMS core.

Network 210 may include one or more wired and/or wireless networks. For example, network 210 may include a cellular network, a public land mobile network ("PLMN"), a second generation ("2G") network, a third generation ("3G") network, a fourth generation ("4G") network, a fifth generation ("5G") network, an LTE network, and/or another network. Additionally, or alternatively, network 210 may include a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, and/or a combination of these or other types of networks.

MME 220 may include one or more computation and/or communication devices that gather, process, search, store, and/or provide information in a manner described herein. In some implementations, MME 220 may perform operations relating to authentication of user device 265. Additionally, or alternatively, MME 220 may facilitate the selection of a PGW 225 and/or an SGW 230 to serve traffic to and/or from user device 265. MME 220 may perform an operation associated with handing off user device 265 from a first base station 260 to a second base station 260 when user device 265 is transitioning from a cell associated with the first base station 260 to a cell associated with the second base station 260. Additionally, or alternatively, MME 220 may select another MME (not pictured), to which user device 265 should be handed off (e.g., when user device 265 moves out of range of MME 220).

PGW 225 may include one or more computation and/or communication devices that gather, process, search, store, and/or provide information in a manner described herein. PGW 225 may include one or more data processing and/or traffic transfer devices, such as a gateway, a router, a modem, a switch, a firewall, a network interface card ("NIC"), a hub, a bridge, a proxy server, an optical add/drop multiplexer ("OADM"), or any other type of device that processes and/or transfers traffic. In some implementations, PGW 225 may aggregate traffic received from one or more SGWs 230, and may send the aggregated traffic to network 210. Additionally, or alternatively, PGW 225 may receive traffic from network 210 and may send the traffic to user device 265 via SGW 230.

SGW 230 may include one or more computation and/or communication devices that gather, process, search, store, and/or provide information in a manner described herein. SGW 230 may include one or more data processing and/or traffic transfer devices, such as a gateway, a router, a modem, a switch, a firewall, a NIC, a hub, a bridge, a proxy server, an OADM, or any other type of device that processes and/or transfers traffic. In some implementations, SGW 230 may aggregate traffic received from one or more base stations 260 associated with the LTE network, and may send the aggregated traffic to network 210 (e.g., via PGW 225) and/or other network devices associated with the IMS core and/or the EPC. SGW 230 may also receive traffic from network 210 and/or other network devices, and may send the received traffic to user device 265 via base station 260. Additionally, or alternatively, SGW 230 may perform operations associated with handing off user device 265 to and/or from the LTE network.

PCRF server 235 may include one or more server devices, or other types of computation and/or communication devices, that gather, process, search, store, and/or provide information in a manner described herein. In some implementations, PCRF server 235 may establish quality of service and charging (e.g., packet accounting) rules for a communication session based on committed quality of service levels per subscriber, per user device, per service type, per application, etc. PCRF server 235 may receive input (e.g., from the IMS core) regarding users, user devices 265, subscriptions, and/or applications. PCRF server 235 may create quality of service and charging policy rules for the session (e.g., for a user, a subscriber, a user device 265, an application, etc.), and may provide the policy rules to PGW 225, which may handle packets for the communication session with a particular user device 265 (e.g., running a particular application) based on the policy rules.

HSS 240 and/or AAA server 245 may include one or more server devices, or other types of computation and/or communication devices, that gather, process, search, store, and/or provide information in a manner described herein. For example, HSS 240 may manage, update, and/or store, in a memory associated with HSS 240, profile information associated with user device 265 that identifies applications and/or services that are permitted for use by and/or accessible by user device 265, information associated with a user of user device 265 (e.g., a username, a password, a personal identification number ("PIN"), etc.), subscription information, rate information, minutes allowed, bandwidth allocation policy information, and/or other information. AAA server 245 may include a device that performs authentication, authorization, and/or accounting operations associated with a communication session associated with user device 265.

CSCF server 250 may include one or more server devices, or other types of computation and/or communication devices, that gather, process, search, store, and/or provide information in a manner described herein. CSCF server 250 may process and/or route calls to and from user device 265 via the EPC. For example, CSCF server 250 may process calls received from network 210 that are destined for user device 265. In another example, CSCF server 250 may process calls received from user device 265 that are destined for network 210.

Application server 255 may include one or more server devices, or other types of computation and/or communication devices, that gather, process, search, store, and/or provide information in a manner described herein. Application server 255 may host and execute applications and/or services, such as IMS services, and may interface with CSCF server 250. For example, application server 255 may include a telephony application server.

Base station 260 may include one or more devices that receive, process, and/or transmit traffic, such as audio, video, text, and/or other data, destined for and/or received from user device 265. In some implementations, base station 260 may be include an eNB associated with the LTE network that receives traffic from and/or sends traffic to network 210 via PGW 225 and/or SGW 230. Additionally, or alternatively, one or more base stations 260 may be associated with a RAN that is not associated with the LTE network. Base station 260 may send traffic to and/or receive traffic from user device 265 via an air interface. In some implementations, base station 260 may be a small cell, such as a microcell, a picocell, and/or a femtocell.

User device 265 may include any computation and/or communication device, such as a wireless mobile communication device, that is capable of communicating with base station 260 and/or a network (e.g., network 210). For example, user device 265 may include a radiotelephone, a personal communications system ("PCS") terminal (e.g., that may combine a cellular radiotelephone with data processing and data communications capabilities), a personal digital assistant ("PDA") (e.g., that can include a radiotelephone, a pager, Internet/intranet access, etc.), a smart phone, a laptop computer, a tablet computer, a personal gaming system, and/or another type of mobile computation and/or communication device. User device 265 may send traffic to and/or receive traffic from network 210 (e.g., via base station 260, SGW 230, and/or PGW 225).

Monitoring device 270 may include one or more server devices, or other types of computation and/or communication devices, that gather, process, search, store, and/or provide information in a manner described herein. In some implementations, monitoring device 270 may gather information associated with network problems. For example, monitoring device 270 may gather information about an application that causes a problem with network 210, the EPS, the EPC, the IMS core, the LTE network, and/or user device 265. Monitoring device 270 may gather the information from any of the devices and/or networks illustrated in FIG. 2 (or from other devices and/or networks, not shown). Additionally, or alternatively, monitoring device 270 may transmit information relating to the application to user devices 265, and may receive information associated with the application from user devices 265.

While shown as being located external to the EPS and the EPC, monitoring device 270 may be implemented within the EPS and/or the EPC. Additionally, or alternatively, while shown as separate from PGW 225, SGW 230, and/or base station 260, monitoring device 270 may be integrated into (and a part of) PGW 225, SGW 230, and/or base station 260.

The number of devices and/or networks illustrated in FIG. 2 is provided for explanatory purposes. In practice, there may be additional devices and/or networks, fewer devices and/or networks, different devices and/or networks, or differently arranged devices and/or networks than those illustrated in FIG. 2. Furthermore, two or more of the devices illustrated in FIG. 2 may be implemented within a single device, or a single device illustrated in FIG. 2 may be implemented as multiple, distributed devices. Additionally, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
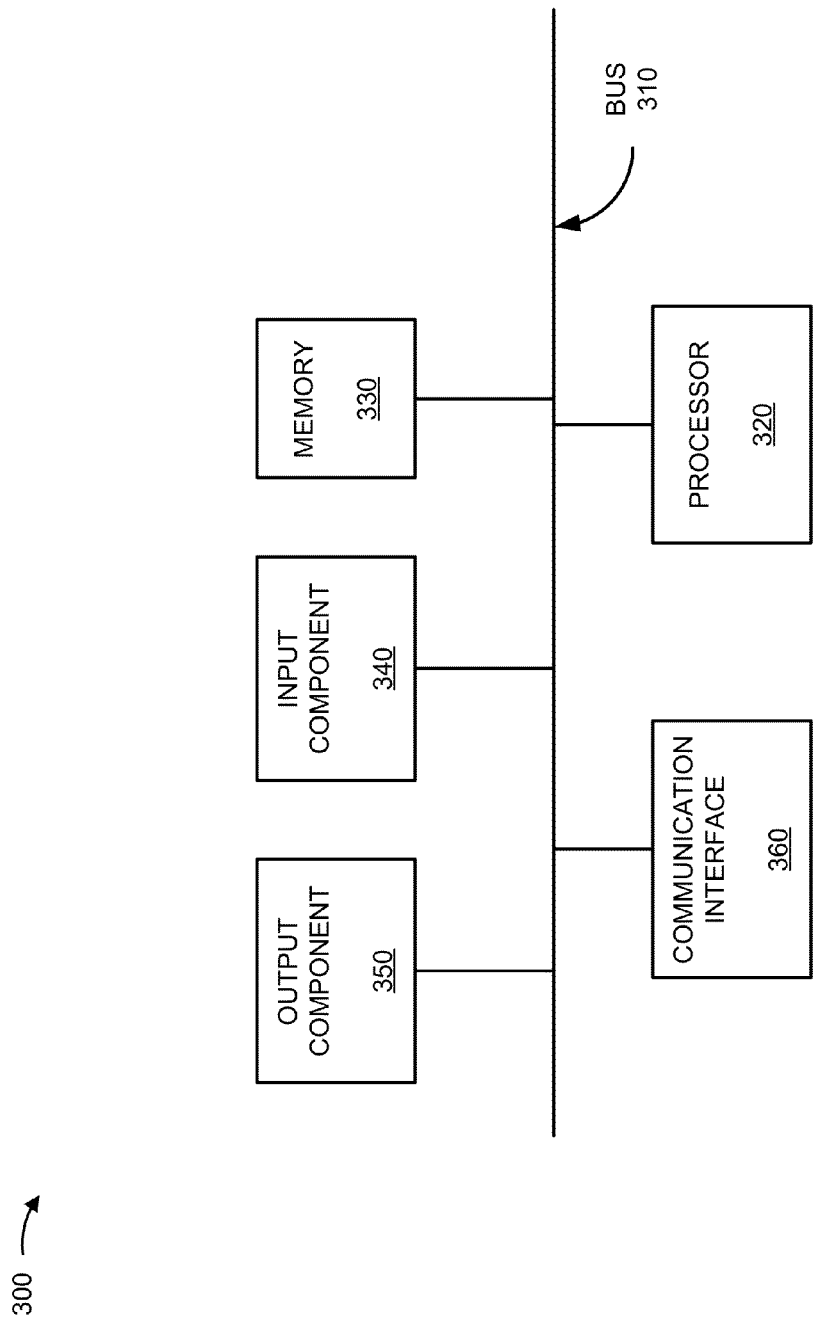
FIG. 3 is a diagram of example components of one or more devices of FIG. 2.

FIG. 3 is a diagram of example components of a device 300. Device 300 may correspond to MME 220, PGW 225, SGW 230, PCRF server 235, HSS 240, AAA server 245, CSCF server 250, application server 255, base station 260, user device 265, and/or monitoring device 270. As illustrated in FIG. 3, device 300 may include a bus 310, a processor 320, a memory 330, an input component 340, an output component 350, and a communication interface 360.

Bus 310 may include a path that permits communication among the components of device 300. Processor 320 may include a processor, a microprocessor, and/or any processing logic (e.g., a field-programmable gate array ("FPGA"), an application-specific integrated circuit ("ASIC"), etc.) that interprets and/or executes instructions. In some implementations, processor 320 may include one or more processor cores. Memory 330 may include a random access memory ("RAM"), a read only memory ("ROM"), and/or any type of dynamic or static storage device (e.g., a flash, magnetic, or optical memory) that stores information and/or instructions for use by processor 320.

Input component 340 may include any mechanism that permits a user to input information to device 300 (e.g., a keyboard, a keypad, a mouse, a button, a switch, etc.). Output component 350 may include any mechanism that outputs information from device 300 (e.g., a display, a speaker, one or more light-emitting diodes ("LEDs"), etc.).

Communication interface 360 may include any transceiver-like mechanism, such as a transceiver and/or a separate receiver and transmitter, that enables device 300 to communicate with other devices and/or systems, such as via a wired connection, a wireless connection, or a combination of wired and wireless connections. For example, communication interface 360 may include a mechanism for communicating with another device and/or system via a network, such as network 210, the EPS, the EPC, the IMS core, and/or the LTE network. Additionally, or alternatively, communication interface 360 may include a logical component with input and output ports, input and output systems, and/or other input and output components that facilitate the transmission of data to and/or from another device, such as an Ethernet interface, an optical interface, a coaxial interface, an infrared interface, a radio frequency ("RF") interface, a universal serial bus ("USB") interface, or the like.

Device 300 may perform various operations described herein. Device 300 may perform these operations in response to processor 320 executing software instructions included in a computer-readable medium, such as memory 330. A computer-readable medium may be defined as a non-transitory memory device. A memory device may include space within a single storage device or space spread across multiple storage devices.

Software instructions may be read into memory 330 from another computer-readable medium or from another device via communication interface 360. When executed, software instructions stored in memory 330 may cause processor 320 to perform one or more processes that are described herein. Additionally, or alternatively, hardwired circuitry may be used in place of or in combination with software instructions to perform one or more processes described herein. Thus, implementations described herein are not limited to any specific combination of hardware circuitry and software.

The number of components illustrated in FIG. 3 is provided for explanatory purposes. In practice, device 300 may include additional components, fewer components, different components, or differently arranged components than those illustrated in FIG. 3. Additionally, or alternatively, each of MME 220, PGW 225, SGW 230, PCRF server 235, HSS 240, AAA server 245, CSCF server 250, application server 255, base station 260, user device 265, and/or monitoring device 270 may include one or more devices 300 and/or one or more components of device 300.

Figure 4:
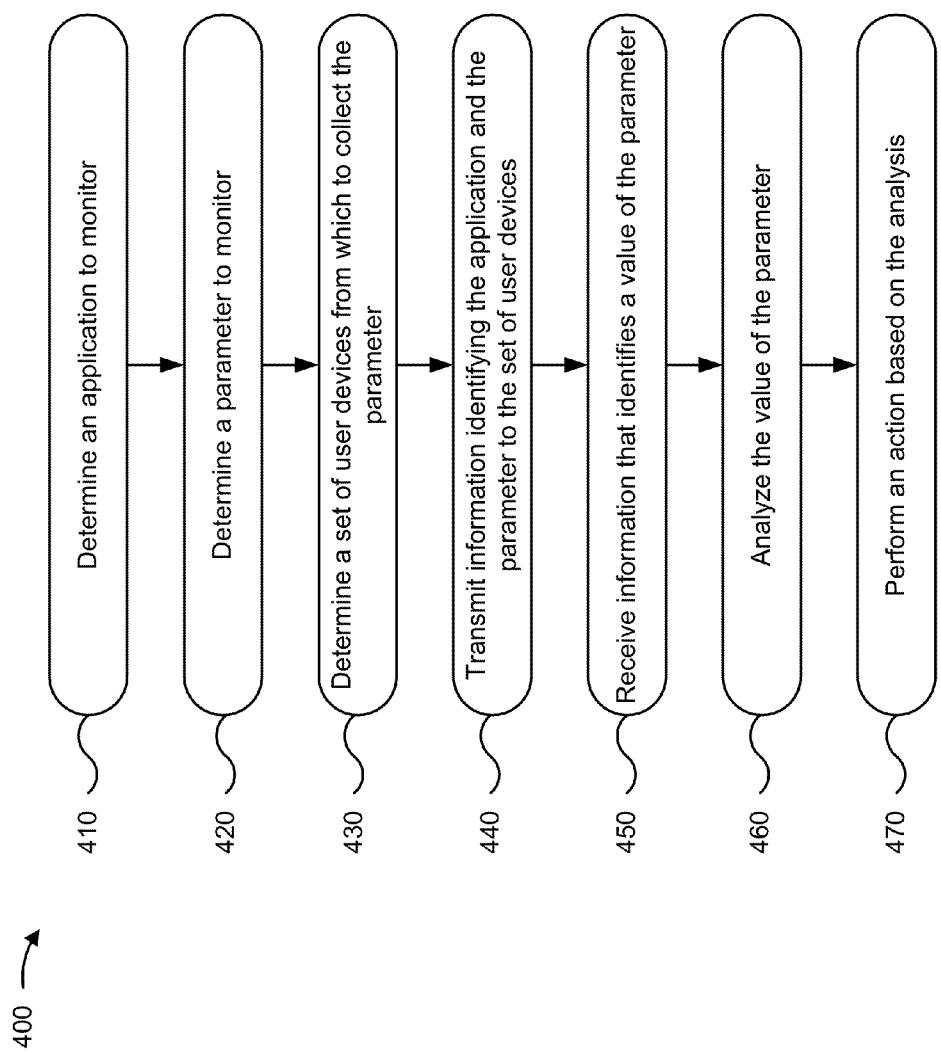
FIG. 4 is a diagram of an example process for collecting information associated with an application, according to an implementation described herein.

FIG. 4 is a diagram of an example process 400 for collecting information associated with an application. In some implementations, one or more process blocks of FIG. 4 may be performed by one or more components of monitoring device 270. Additionally, or alternatively, one or more process blocks of FIG. 4 may be performed by one or more components of another device or a collection of devices including or excluding monitoring device 270.

As shown in FIG. 4, process 400 may include determining an application to monitor (block 410). In some implementations, the application may be associated with poor network performance and/or poor device performance. In some implementations, monitoring device 270 may monitor network performance (e.g., of network 210, the EPS, the EPC, the IMS core, the LTE network, etc.), and/or may monitor performance of one or more devices associated with a network (e.g., devices 220-265, FIG. 2). Monitoring device 270 may determine an application that is causing and/or contributing to poor network performance and/or poor device performance. Additionally, or alternatively, monitoring device 270 may receive (from another device and/or from a user) information that identifies an application to monitor. In some implementations, monitoring device 270 may monitor multiple applications.

In some implementations, monitoring device 270 may identify poor network performance and/or poor device performance by measuring a parameter associated with the network and/or the device, such as latency, packet error rate, jitter, packet delay variation, signal strength, voice quality, video quality, quality of service, call failure rate, call setup success rate, call setup time, bit rate, bandwidth, throughput, and/or any other parameter that may be used to measure network and/or device performance. In some implementations, the parameter may indicate a severity of a network problem and/or a device problem. Monitoring device 270 may use any quantity and/or combination of parameters to identify poor performance. In some implementations, monitoring device 270 may compare a value of a parameter to a threshold to determine that performance is poor.

In some implementations, monitoring device 270 may identify an application that is a cause of the poor performance. For example, monitoring device 270 may determine that a particular application is impacting a parameter associated with poor network and/or device performance, or may determine that a particular application is causing and/or contributing to an undesirable value of a parameter. For example, monitoring device 270 may determine that the particular application is running during poor performance (e.g., based on a parameter value), that the particular application is associated with (e.g., sending or receiving) packets exhibiting poor performance, that a particular application has caused a device to crash, etc.

In some implementations monitoring device 270 may automatically determine an application to monitor, based on an indication of poor network performance. Additionally, or alternatively, monitoring device 270 may determine an application to monitor based on user input.

As further shown in FIG. 4, process 400 may include determining a parameter to monitor (block 420). In some implementations, monitoring device 270 may monitor a set of parameters (e.g., may compare each parameter to a different threshold) to determine that a network and/or a device is experiencing poor performance. Monitoring device 270 may determine that a parameter with an undesirable value (e.g., a value above or below a threshold, a value equal to a predetermined value, etc.) should be collected from a set of user devices 265. Additionally, or alternatively, monitoring device 270 may receive (from another device and/or from a user) information that identifies a parameter to be collected from the set of user devices 265. The parameter may be associated with user device 265, may be associated with another network device (e.g., devices 220-260, FIG. 2), and/or may be associated with a particular application (e.g., an application running on user device 265).

In some implementations, monitoring device 270 may store (e.g., in memory) a parameter associated with a particular type of network and/or device problem. Monitoring device 270 may receive an indication that a network and/or device is experiencing a particular problem, and may retrieve, from memory, the parameter associated with the particular problem. Additionally, or alternatively, monitoring device 270 may store (e.g., in memory) a parameter associated with a particular application. Monitoring device 270 may receive an indication that a particular application is causing poor performance, and may retrieve, from memory, the parameter associated with the particular application.

In some implementations, the parameter may include information that identifies a user device 265 from which the parameter is collected, such as a device identifier (e.g., an international mobile subscriber identity, an international mobile equipment identity, a mobile equipment identifier, etc.), a device type (e.g., mobile phone, smart phone, tablet, a mobile phone model, a smart phone model, a tablet model, etc.), a device type identifier (e.g., a model number, a serial number, etc.), etc. Additionally, or alternatively, the parameter may include information that identifies a characteristic of a user device 265 from which the parameter is collected, such as a hardware parameter of user device 265 (e.g., a processor included in user device 265, processing power of the processor, an amount of memory included in user device 265, an amount of available memory on user device 265, etc.), a software parameter of user device 265 (e.g., a quantity of applications running on user device 265, an identification of the applications running on user device 265, an amount of device memory being used by the applications running on user device 265, etc.), etc.

In some implementations, the parameter may include information that identifies a location of a user device 265 from which the parameter is collected, such as a geographic location of user device 265 (e.g., identified by latitude and longitude, determined using a global positioning system component and/or a triangulation component, etc.), a cell site associated with user device 265 (e.g., a region associated with one or more base stations 260 that are in communication with user device 265), a network device identifier that identifies a network device that is communicating with user device 265 (e.g., an MME 220, a PGW 225, an SGW 230, a base station 260, etc.), etc.

In some implementations, the parameter may include performance information. For example, the parameter may include a packet error rate associated with user device 265, a packet error rate associated with a network device communicating with user device 265, and/or a packet error rate associated with an application being run by user device 265. The packet error rate may include a quantity of packets that are not received and/or are incorrectly received (e.g., altered due to noise, interference, distortion, packet asynchronization, etc.) at a destination device during a time period. Additionally, or alternatively, the parameter may include latency information, such as a delay between sending a packet from a source device (e.g., base station 260, user device 265, etc.) and receiving the packet at a destination device (e.g., base station 260, user device 265, etc.). Additionally, or alternatively, the parameter may include jitter and/or packet delay variation (e.g., a difference in delay between a set of packets transmitted from a source device to a destination device).

In some implementations, the parameter may include signal strength information. Signal strength information may include a received signal strength indicator ("RSSI") value associated with a wireless connection (e.g., a wireless connection between base station 260 and user device 265). An RSSI value may represent a measurement of power present in a received radio signal. Additionally, or alternatively, signal strength information may include a signal to interference plus noise ratio ("SINR") value associated with a wireless connection. An SINR value may measure the quality of a wireless connection, and may be calculated as SINR=P/(I+N), where P represents signal power, I represents interference power, and N represents noise power.

In some implementations, the parameter may include quality information associated with user device 265 and/or an application running on user device 265, such as voice and/or video quality (e.g., calculated using a mean opinion score), a quality of service, etc.

In some implementations, the parameter may include a call failure rate (e.g., a fraction of calls that fail to connect to a desired device), a call setup success rate (e.g., a fraction of calls that successfully connect to a desired device), a call setup time (e.g., a length of time required to establish a call between devices), or the like. Additionally, or alternatively, the parameter determined by monitoring device 270 may include a bit rate, bandwidth, and/or throughput associated with a connection between devices (e.g., measured in kilobits per second, megabits per second, gigabits per second, etc.).

In some implementations, the parameter may include information that identifies a network to which user device 265 is connected (e.g., an LTE network, a 3G network, an SMS network, etc.) and/or a network used by an application running on user device 265. Additionally, or alternatively, the parameter may include an identification of a network process that user device 265 is undergoing, such as a handoff between network devices (e.g., MMEs 220, base stations 260, etc.).

In some implementations, the parameter may include time information, such as a time at which the parameter is measured by user device 265, transmitted by user device 265, and/or received by monitoring device 270. In some implementations, the parameter may be collected before, during, and/or after an application is running on user device 265 (e.g., the application to be monitored).

Returning to FIG. 4, process 400 may include determining a set of user devices from which to collect the parameter (block 430). In some implementations, monitoring device 270 may receive (from another device and/or from a user) information that identifies the set of user devices 265 from which to collect the parameter. Additionally, or alternatively, monitoring device 270 may determine the user devices 265 based on the application to be monitored. For example, the application may be associated with a particular type of user device 265. Additionally, or alternatively, monitoring device 270 may determine the user devices 265 based on network and/or device performance. For example, monitoring device 270 may determine that a particular user device type is experiencing a problem, and may collect the parameter from user devices 265 of the user device type. Additionally, or alternatively, monitoring device 270 may determine that a network device (e.g., devices 220-260, FIG. 2) is experiencing a problem, and may collect the parameter from user devices 265 that are in connection with and/or communicating with the network device.

In some implementations, monitoring device 270 may determine the user device 265 based on whether the application to be monitored is installed on user device 265. For example, monitoring device 270 may select a user device 265 from which to collect the parameter when the user device 265 has the application installed and/or present on the user device 265.

In some implementations, monitoring device 270 may determine the user devices 265 based on a geographic location. For example, monitoring device 270 may determine that a particular geographic region is experiencing a problem, and may collect the parameter from user devices 265 located within the geographic region.

In some implementations, monitoring device 270 may determine the user devices 265 based on a user and/or a user profile associated with user device 265. For example, a user may decide to allow monitoring device 270 to collect the parameter from a user device 265 associated with the user, and the user may give express permission for monitoring device 270 to collect the parameter. In some implementations, the user may give permission for monitoring device 270 to collect one set of parameters, and may not give permission to collect another set of parameters.

As further shown in FIG. 4, process 400 may include transmitting information identifying the application and the parameter to the set of user devices (block 440). In some implementations, monitoring device 270 may transmit the information to user devices 265 periodically (e.g., once per minute, once per hour, once per day, etc.). Additionally, or alternatively, monitoring device 270 may transmit the information based on the determination of poor device and/or network performance. For example, monitoring device 270 may determine that a network is performing poorly by comparing a parameter to a threshold, and may transmit the information in response to determining that the network is performing poorly.

In some implementations, monitoring device 270 may transmit the information to user devices 265 based on a network condition. For example, monitoring device 270 may transmit the information during offpeak hours (e.g., offpeak hours of a service area in which user devices 265 are located). Additionally, or alternatively, monitoring device 270 may transmit the information to user devices 265 based on device conditions. For example, user device 265 may enter a service associated with poor performance, and monitoring device 270 may transmit the information to user device 265 based on user device 265 entering the service area.

In some implementations, monitoring device 270 may set a quality of service parameter of the application to be run on user device 265. For example, monitoring device 270 may set a quality of service parameter based on a location of user device 265 (e.g., geographic location, service area location, proximity to a network device, etc.), a service subscription associated with user device 265, network conditions, and/or other network parameters. In this way, monitoring device 270 may maintain a performance of user device 265 while the application is running, and may prevent user device 265 from experiencing a performance degradation while running the application.

As still further shown in FIG. 4, process 400 may include receiving information that identifies a value of the parameter (block 450). In some implementations, user device 265 may run an application and monitor a parameter to determine a value of the parameter, as discussed further in connection with FIG. 5. The value of the parameter may identify performance information associated with the parameter and associated with user device 265. Monitoring device 270 may receive, from user device 265, information that identifies the value of the parameter. Additionally, or alternatively, monitoring device 270 may receive information that identifies the value of the parameter from another device (e.g., devices 220-260, FIG. 2). In some implementations, monitoring device 270 may receive the information periodically (e.g., once per minute, once per hour, once per day, etc.). Additionally, or alternatively, monitoring device 270 may receive the information based on a network condition, such as during offpeak hours.

As still further shown in FIG. 4, process 400 may include analyzing the value of the parameter (block 460). In some implementations, monitoring device 270 may aggregate the received value, and may analyze the aggregated information. In some implementations, monitoring device 270 may aggregate information received from a single user device 265. For example, monitoring device 270 may periodically receive a value from user device 265, and may average multiple values received over a time period. Additionally, or alternatively, monitoring device 270 may aggregate information received from multiple user devices 265. For example, monitoring device 270 may determine the average value of multiple values received from multiple user devices 265. Additionally, or alternatively, monitoring device 270 may determine a maximum received value and/or a minimum received value (e.g., during a particular time period). Additionally, or alternatively, monitoring device 270 may aggregate information by device type, by geographic region, by service area, etc.

In some implementations, monitoring device 270 may analyze the received information to determine a cause of poor network and/or device performance. For example, monitoring device 270 may determine, using a threshold, whether the monitored application is a cause of and/or a contributor to poor network and/or device performance. For example, monitoring device 270 may determine that the application is a cause of poor network performance when more than half of user devices 265 return a parameter value that is less than (or greater than) a threshold.

As an example, assume that monitoring device 270 sends an instruction to user device 265 to download an application, "App Z," and monitor a signal strength (e.g., RSSI, SINR, received power level of a signal, etc.) before, during, and after running App Z. Monitoring device 270 may determine that App Z is a cause of poor performance if the signal strength received while App Z is running is less than (e.g., less than by more than a threshold amount) the signal strength before and/or after running App Z. Additionally, or alternatively, monitoring device 270 may determine that App Z is a cause of poor performance if the signal strength received after App Z has run is less than (e.g., less than by more than a threshold amount) the signal strength received before App Z has run.

In some implementations, monitoring device 270 may gather the above signal strength information from multiple user devices 265, for example ten (10) user devices 265. Monitoring device 270 may determine that App Z is a cause of poor performance if the signal strength while running App Z is less than the signal strength before and/or after running App Z on more than a threshold quantity of user devices (e.g., more than half, or at least six (6) user devices 265). This example of using a threshold with multiple user devices 265 may be applied to other parameters, and is discussed here with respect to signal strength as an example.

Additionally, or alternatively, monitoring device 270 may aggregate the signal strength received from the ten (10) user devices 265. For example, monitoring device 270 may calculate the average signal strength received from the ten (10) user devices 265. Monitoring device 270 may compare the aggregated value (e.g., the average) to a threshold to determine whether App Z is a cause of poor performance. For example, monitoring device 270 may determine that App Z is a cause of poor performance if the average signal strength while running App Z is less than the average signal strength before and/or after running App Z. This example of using an aggregated and/or average parameter value may be applied to other parameters, and is discussed here with respect to signal strength as an example.

In some implementations, monitoring device 270 may collect location information from user device 265 before, during, and after running App Z. Monitoring device 270 may use the location information to determine whether a change in signal strength is caused by App Z, or caused by the location of user device 265. For example, monitoring device 270 may determine that user device 265 was traveling away from base station 260 while App Z was running, and may determine that App Z was not a cause of the poor performance. This example of using location information to determine that an application is not a cause of poor performance may be applied to other parameters, and is discussed here with respect to signal strength as an example.

As another example, assume that monitoring device 270 sends an instruction to user device 265 to download App Z and monitor a packet error rate before, during, and after running App Z. Monitoring device 270 may determine that App Z is a cause of poor performance if the packet error rate while App Z is running is greater than the packet error rate before and/or after running App Z. Additionally, or alternatively, monitoring device 270 may determine that App Z is a cause of poor performance if the packet error rate after App Z has run is greater than (e.g., by more than a threshold amount) the packet error rate before App Z has run.

In some implementations, monitoring device 270 may use multiple parameters to determine whether an application is a cause of poor performance. For example, monitoring device 270 may determine that App Z is a cause of poor performance if the packet error rate while App Z is running is greater than the packet error rate before and/or after running App Z, and if the signal strength while App Z is running is less than the signal strength before and/or after running App Z. This example of using multiple parameters to determine that an application is not a cause of poor performance may be applied to other parameters, and is discussed here with respect to packet error rate and signal strength as an example.

As another example, assume that monitoring device 270 sends an instruction to user device 265 to download App Z and monitor a packet delay and/or a packet delay variation before, during, and after running App Z. Monitoring device 270 may determine that App Z is a cause of poor performance if the packet delay and/or packet delay variation while App Z is running is greater than the packet delay and/or packet delay variation before and/or after running App Z. Additionally, or alternatively, monitoring device 270 may determine that App Z is a cause of poor performance if the packet delay and/or packet delay variation after App Z has run is greater than (e.g., by more than a threshold amount) the packet delay and/or packet delay variation before App Z has run.

Additionally, or alternatively, monitoring device 270 may determine that App Z is a cause of poor performance if the call failure rate and/or call setup time while App Z is running is greater than the call failure rate and/or call setup time before and/or after running App Z. Additionally, or alternatively, monitoring device 270 may determine that App Z is a cause of poor performance if the call failure rate and/or call setup time after App Z has run is greater than (e.g., by more than a threshold amount) the call failure rate and/or call setup time before App Z has run.

Additionally, or alternatively, monitoring device 270 may determine that App Z is a cause of poor performance if the call setup success rate while App Z is running is less than the call setup success rate before and/or after running App Z. Additionally, or alternatively, monitoring device 270 may determine that App Z is a cause of poor performance if the call setup success rate after App Z has run is less than (e.g., by more than a threshold amount) the call setup success rate before App Z has run.

Additionally, or alternatively, monitoring device 270 may determine that App Z is a cause of poor performance if the bit rate, bandwidth, and/or throughput while App Z is running is less than the bit rate, bandwidth, and/or throughput before and/or after running App Z. Additionally, or alternatively, monitoring device 270 may determine that App Z is a cause of poor performance if the bit rate, bandwidth, and/or throughput after App Z has run is less than (e.g., by more than a threshold amount) the bit rate, bandwidth, and/or throughput before App Z has run.

Additionally, or alternatively, monitoring device 270 may determine that App Z is a cause of poor performance if the voice quality, video quality, and/or quality of service while App Z is running is less than the voice quality, video quality, and/or quality of service before and/or after running App Z. Additionally, or alternatively, monitoring device 270 may determine that App Z is a cause of poor performance if the voice quality, video quality, and/or quality of service after App Z has run is less than (e.g., by more than a threshold amount) the voice quality, video quality, and/or quality of service before App Z has run.

In some implementations, monitoring device 270 may collect a hardware parameter (e.g., processing power, available memory, device type) from user device 265 (e.g., before, during and/or after running App Z). Monitoring device 270 may use the hardware parameter to determine whether poor performance is caused by App Z, or caused by hardware limitations and/or conditions of user device 265. For example, monitoring device 270 may determine that user device 265 has low processing power and/or low memory (e.g., lower than a threshold), and may determine that App Z was not a cause of the poor performance. Additionally, or alternatively, monitoring device 270 may determine that App Z was a cause of the low processing power and/or low memory. Additionally, or alternatively, monitoring device 270 may determine that App Z running on a particular user device (e.g., a device type, a model number, a device with a particular hardware configuration, etc.) is a cause of poor performance.

In some implementations, monitoring device 270 may collect a software parameter from user device 265 (e.g., before, during and/or after running App Z). Monitoring device 270 may use the software parameter to determine whether poor performance is caused by App Z, or caused by software limitations and/or conditions of user device 265. For example, monitoring device 270 may determine that user device 265 is running a large quantity of applications simultaneously (e.g., more than a threshold), and may determine that App Z was not a cause of the poor performance. Additionally, or alternatively, monitoring device 270 may determine that App Z running in conjunction with another particular application is a cause of poor performance.

In some implementations, monitoring device 270 may collect information regarding the type of network (e.g., LTE, 3G, etc.) to which user device is connected before, during, and/or after running App Z. Monitoring device 270 may use the network type to determine whether App Z was a cause of poor performance. For example, monitoring device 270 may determine that App Z was a cause of poor performance if user device 265 is connected to an LTE network before running App Z, and user device 265 is connected to a 3G network during and/or after running App Z.

In some implementations, monitoring device 270 may determine that user device 265 was undergoing a network process (e.g., a handoff between network devices) before, during, and/or after running App Z. Monitoring device 270 may use information associated with the network process to determine whether App Z was a cause of poor performance. For example, monitoring device 270 may determine that App Z was not a cause of poor performance if user device 265 was undergoing a handoff between base stations 260 during the running of App Z.

Returning to FIG. 4, process 400 may include performing an action based on the analysis (block 470). In some implementations, monitoring device 270 may provide the received parameter values (and/or aggregated parameter values) to a display device, where the parameter values may be displayed. In some implementations, if monitoring device 270 determines that an application is a cause of a network problem, monitoring device 270 may provide information that identifies the application to network 210 (and/or a device associated with network 210) in order to disable the application (e.g., disable the application on the network, disable use of the application on particular devices, disable use of the application in conjunction with another application, etc.).

Additionally, or alternatively, monitoring device 270 may transmit an alarm and/or a notification to a device. Additionally, or alternatively, monitoring device 270 may generate a report based on the analysis, and may transmit the report to a device. The device may be associated with network 210, a network operator, an application developer, and/or an end user.

In some implementations, monitoring device 270 may provide information to a device associated with a developer of the application (e.g., indicating that the application causes problems under certain conditions, notifying the developer that the application has been disabled, and/or recommending that the developer fix the application). Additionally, or alternatively, monitoring device 270 may provide information to user devices 265 that include the application (e.g., indicating that the application causes problems under certain conditions, notifying the user that the application has been disabled, and/or recommending that the user not run the application). Additionally, or alternatively, monitoring device 270 may provide information to a network device, such as a network device associated with a network operator.

While a series of blocks has been described with regard to FIG. 4, the order of the blocks may be modified in some implementations. Additionally, or alternatively, non-dependent blocks may be performed in parallel.

Figure 5:
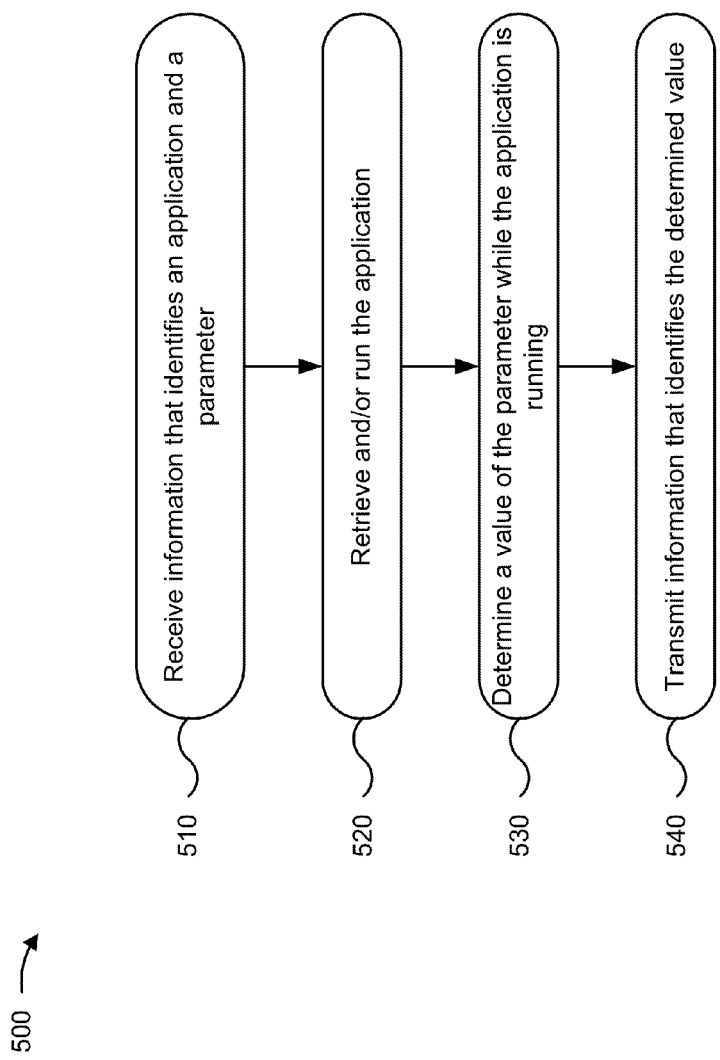
FIG. 5 is a diagram of an example process for transmitting information associated with an application, according to an implementation described herein.

FIG. 5 is a diagram of an example process 500 for transmitting information associated with an application. In some implementations, one or more process blocks of FIG. 5 may be performed by one or more components of user device 265. Additionally, or alternatively, one or more process blocks of FIG. 5 may be performed by one or more components of another device or a collection of devices including or excluding user device 265.

As shown in FIG. 5, process 500 may include receiving information that identifies an application and a parameter (block 510). In some implementations, user device 265 may receive the information transmitted by monitoring device 270, as discussed herein in connection with FIG. 4.

As further shown in FIG. 5, process 500 may include retrieving and/or running the application (block 520). In some implementations, user device 265 may retrieve (e.g., may download) the application from network 210 and/or a device associated with network 210. Additionally, or alternatively, user device 265 may already have the application downloaded and/or installed, and may retrieve the application from memory.

In some implementations, the retrieval and running of the application may be automatic (e.g., may not require user intervention), and a user may have given prior express permission for the automatic retrieval and running of the application. Additionally, or alternatively, user device 265 may receive, from monitoring device 270, an instruction to disable, exit, and/or uninstall one or more other applications while the application is running. Additionally, or alternatively, user device 265 may receive, from monitoring device 270, an instruction to run the application using a particular network (e.g., a 3G network, an LTE network, etc.), or to communicate with a particular network device (e.g., base station 260) when running the application.

As still further shown in FIG. 5, process 500 may include determining a value of the parameter while the application is running (block 530). In some implementations, user device 265 may run the application, and may periodically determine a value of the parameter (e.g., once per second, once per minute, once per hour, etc.). Additionally, or alternatively, user device 265 may determine a value of the parameter based on a device event, such as a loss of a network connection, an application crash, etc. User device 265 may terminate and/or uninstall the application after a predetermined amount of information has been collected. In some implementations, user device 265 may download, install, and/or run a monitoring application that determines the value of the parameter.

As still further shown in FIG. 5, process 500 may include transmitting information that identifies the determined value (block 540). In some implementations, user device 265 may transmit the information, to monitoring device 270, as the information is collected. Additionally, or alternatively, user device 265 may transmit the information periodically. Additionally, or alternatively, user device 265 may transmit the information based on a network condition, such as during offpeak hours (e.g., offpeak hours of a service area in which user device 265 is located). Additionally, or alternatively, user device 265 may transmit the information based on user device conditions. For example, user device 265 may transmit the information when user device 265 has collected and/or stored more than a predetermined quantity of information.

While a series of blocks has been described with regard to FIG. 5, the order of the blocks may be modified in some implementations. Additionally, or alternatively, non-dependent blocks may be performed in parallel.

Figure 6:
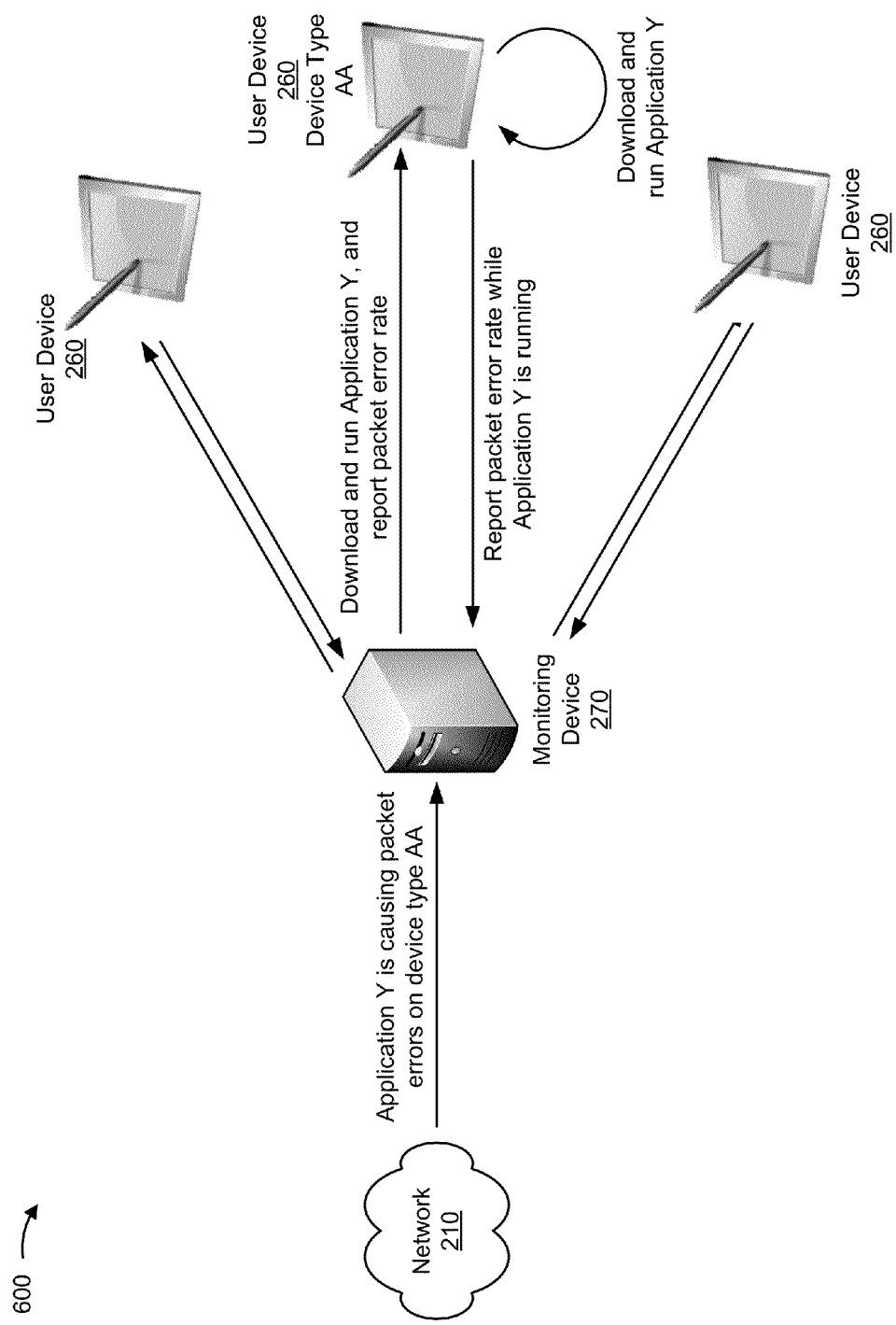
FIG. 6 is a diagram of an example implementation described herein.

FIG. 6 is a diagram of an example implementation 600 described herein. As illustrated, example implementation may include network 210, monitoring device 270, and user devices 265.

As illustrated in FIG. 6, monitoring device 270 may receive an indication that "Application Y" is causing packet errors on device type "AA." Monitoring device 270 may transmit instructions to user devices 265, of device type AA, to download Application Y and monitor a packet error rate while Application Y is running. User devices 265 may download and/or run Application Y, and may monitor the packet error rate while Application Y is running. User devices 265 may transmit information that identifies the packet error rate to monitoring device 270.

Implementations described herein may enable a network provider to more accurately diagnose a cause of a problem due to an application by collecting information associated with the problem from a large quantity of user devices. Additionally, implementations described herein may enable a network provider to more efficiently diagnose a cause of a problem by automating information collection.

The foregoing disclosure provides illustration and description, but is not intended to be exhaustive or to limit the embodiments to the precise form disclosed. Modifications and variations are possible in light of the above disclosure or may be acquired from practice of the embodiments.

As used herein, the term "component" is intended to be broadly construed as hardware, firmware, or a combination of hardware and software.

The term "packet," as used herein, may refer to a packet, a datagram, a cell, a fragment of a packet, a fragment of a datagram, a fragment of a cell, or any other type or arrangement of data that may be carried at a specified communication layer.

Some implementations are described herein in conjunction with thresholds. The term "greater than" (or similar terms), used to describe a relationship of a value to a threshold, may be used interchangeably with the term "greater than or equal to." Similarly, the term "less than" (or similar terms), used to describe a relationship of a value to a threshold, may be used interchangeably with the term "less than or equal to."

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A monitoring device, comprising:
    a memory;
    a communication interface; and
    one or more processors that interact with the memory to:
        determine an application to monitor;
        determine a first parameter to monitor, the first parameter being associated with at least one of a network or a device;
        determine a plurality of user devices from which to collect the first parameter;
        transmit, via the communication interface and to the plurality of user devices, information that identifies the application and information that identifies the first parameter;
        receive, via the communication interface and from the plurality of user devices, information that identifies a plurality of values of the first parameter;
        analyze the plurality of values of the first parameter;
        determine, based on analyzing the plurality of values of the first parameter, that the application is a cause of a problem associated with the network or the device; and
        perform an action based on determining that the application is a cause of the problem.

2. The monitoring device of claim 1, where the one or more processors, when performing the action, are further to:
    cause the application to be disabled based on determining that the application is a cause of the problem associated with the network or the device.

3. The monitoring device of claim 1, where the one or more processors, when analyzing the plurality of values of the first parameter, are further to:
    calculate an average value of the plurality of values of the first parameter;
    compare the average value to a threshold value; and
    where the one or more processors, when determining that the application is a cause of the problem, are further to:

determine that the application is a cause of the problem based on comparing the average value to the threshold value.

4. The monitoring device of claim 1, where a first value, of the plurality of values, is measured when the application is running on a user device, of the plurality of user devices, and a second value, of the plurality of values, is measured when the application is not running on the user device.

5. The monitoring device of claim 4, where the one or more processors, when determining that the application is a cause of the problem, are further to:
determine that the application is a cause of the problem when the first value is different from the second value by more than a threshold amount.

6. The monitoring device of claim 1, where the one or more processors are further to:
determine a second parameter to monitor;
transmit, via the communication interface and to the plurality of user devices, information that identifies the second parameter;
receive, via the communication interface and from the plurality of user devices, information that identifies a plurality of values of the second parameter;
where the one or more processors, when analyzing the plurality of values of the first parameter, are further to:
calculate a first average value of the plurality of values of the first parameter;
calculate a second average value of the plurality of values of the second parameter;
compare the first average value to a first threshold value;
compare the second average value to a second threshold value; and
where the one or more processors, when determining that the application is a cause of the problem, are further to:
determine that the application is a cause of the problem based on comparing the first average value to the first threshold value and comparing the second average value to the second threshold value.

7. The monitoring device of claim 1, where the one or more processors, when determining the plurality of user devices, are further to:
determine the plurality of user devices based on at least one of:
a geographic region in which the plurality of user devices are located,
a device type of the plurality of user devices, or
a network device with which the plurality of user devices are communicating.

8. The monitoring device of claim 1, where the first parameter comprises at least one of:
a latency associated with a user device of the plurality of user devices;
a packet error rate associated with the user device;
a packet delay variation associated with the user device;
a signal strength associated with the user device;
a voice quality associated with the user device;
a video quality associated with the user device;
a quality of service associated with the user device;
a call failure rate associated with the user device;
a call setup success rate associated with the user device;
a call setup time associated with the user device; or
a bit rate associated with the user device.

9. A method, comprising:
determining, by a device, an application to monitor, the application being associated with a network problem;
determining, by the device, a parameter to monitor, the parameter being associated with the network problem;
determining, by the device, a plurality of user devices from which to collect the parameter;
transmitting, by the device and to the plurality of user devices, information that identifies the application and information that identifies the parameter;
receiving, by the device and from the plurality of user devices, information that identifies a plurality of parameter values associated with the parameter;
analyzing, by the device, the plurality of parameter values;
determining, by the device and based on analyzing the plurality of parameter values, that the application is a cause of the network problem; and
performing, by the device, an action based on determining that the application is a cause of the network problem.

10. The method of claim 9, where performing the action further comprises:
disabling the application based on determining that the application is a cause of the network problem.

11. The method of claim 9, where analyzing the plurality of parameter values further comprises:
calculating an average value of the plurality of parameter values;
comparing the average value to a threshold value; and
where determining that the application is a cause of the network problem further comprises:
determining that the application is a cause of the network problem based on comparing the average value to the threshold value.

12. The method of claim 9, where a first value, of the plurality of parameter values, is measured while the application is running on a user device of the plurality of user devices, and a second value, of the plurality of parameter values, is measured before the application has started running on the user device or after the application has stopped running on the user device.

13. The method of claim 12, where determining that the application is a cause of the network problem further comprises:
determining that the application is a cause of the network problem when the first value is different from the second value by more than a threshold amount.

14. The method of claim 9, where analyzing the plurality of parameter values further comprises:
determining a quantity of user devices, of the plurality of user devices, for which a parameter value, of the plurality of parameter values, is greater than a first threshold;
comparing the quantity of user devices to a second threshold; and
where determining that the application is a cause of the network problem further comprises:
determining that the application is a cause of the network problem based on comparing the quantity of user devices to the second threshold.

15. The method of claim 9, where analyzing the plurality of parameter values further comprises:
determining a quantity of user devices, of the plurality of user devices, for which a parameter value, of the plurality of parameter values, is less than a first threshold;
comparing the quantity of user devices to a second threshold; and
where determining that the application is a cause of the network problem further comprises:
determining that the application is a cause of the network problem based on comparing the quantity of user devices to the second threshold.

16. The method of claim 9, where determining the plurality of user devices further comprises:

determining the plurality of user devices based on at least one of:
- a geographic region in which the plurality of user devices are located,
- a device type of the plurality of user devices, or
- a network device with which the plurality of user devices are communicating.

17. The method of claim 9, where the parameter comprises at least one of:
- a latency associated with a user device of the plurality of user devices;
- a packet error rate associated with the user device;
- a packet delay variation associated with the user device;
- a signal strength associated with the user device;
- a voice quality associated with the user device;
- a video quality associated with the user device;
- a quality of service associated with the user device;
- a call failure rate associated with the user device;
- a call setup success rate associated with the user device;
- a call setup time associated with the user device; or
- a bit rate associated with the user device.

18. A non-transitory computer-readable medium, comprising:
one or more instructions that, when executed by one or more processors of a device, cause the one or more processors to:
- determine an application to monitor, the application being associated with a problem of a network or a device;
- determine a parameter to monitor, the parameter indicating a performance of the network or the device;
- determine a plurality of user devices from which to collect the parameter;
- transmit, via a communication interface and to the plurality of user devices, information that identifies the application and information that identifies the parameter;
- receive, via the communication interface and from at least one user device of the plurality of user devices, information that identifies a first value of the parameter, the first value being measured during a time period in which the application is running on the at least one user device;
- determine, based on the first value, that the application is a cause of the problem; and
- perform an action based on determining that the application is a cause of the problem.

19. The non-transitory computer-readable medium of claim 18, further comprising:
one or more instructions that, when executed by the one or more processors, cause the one or more processors to:
- receive, via the communication interface and from the at least one user device, information that identifies a second value of the parameter, the second value being measured during a time period in which the application is not running on the at least one user device;
- compare the first value to the second value; and
- where the one or more instructions that, when executed by the one or more processors, cause the one or more processors to determine that the application is a cause of the problem, further cause the one or more processors to:
  - determine that the application is a cause of the problem based on comparing the first value to the second value.

20. The non-transitory computer-readable medium of claim 18, where the parameter comprises at least one of:
- a latency associated with a user device of the plurality of user devices;
- a packet error rate associated with the user device;
- a packet delay variation associated with the user device;
- a signal strength associated with the user device;
- a voice quality associated with the user device;
- a video quality associated with the user device;
- a quality of service associated with the user device;
- a call failure rate associated with the user device;
- a call setup success rate associated with the user device;
- a call setup time associated with the user device; or
- a bit rate associated with the user device.

* * * * *